2,988,133
THERMOPLASTIC MATERIAL
Edward Henry Arthur Lampard, Wrexham, Wales, assignor to British Celanese Limited, a British company
No Drawing. Filed Apr. 12, 1956, Ser. No. 577,894
Claims priority, application Great Britain Apr. 19, 1955
3 Claims. (Cl. 154—28)

This invention relates to thermoplastic material and provides a new method of making heat insulating thermoplastic material.

According to the process of the invention small pieces of thermoplastic material having a high ratio of area to volume are randomly distributed in the form of a layer the depth of which is many times the thickness of the material, and preferably greater than the maximum dimension of any of the pieces of material, the material is then raised to a temperature at which it is soft and adhesive and an air stream is suddenly caused to pass through the layer (preferably by suddenly applying suction to one surface of said layer) while restraining bodily movement of the layer but permitting such movement of the individual pieces under the influence of the suction as results in consolidation of the pieces, still randomly arranged, into a sheet of irregular surface. As will be explained in further detail below, the layer is preferably formed on a rigid perforate or porous substantially horizontal support through the perforations or pores in which the suction is applied.

The material treated preferably comprises pieces of sheet material of area not greater than 0.25 in.$^2$, (e.g. 0.01 to 0.125 in.$^2$) and thickness not greater than about 0.01 in. (e.g. 0.0005 to 0.005 in.). The thermoplastic material may however be in other forms, e.g. in the form of loose fibres or of portions of fabric or in the form of porous flake. Preferably the maximum volume of the pieces should not be greater than 0.0025 in.$^3$ (e.g. 0.00001 to 0.0003 in.$^3$), and the ratio of area to volume should be at least 100 reciprocal inches (e.g. 100 to 5000 reciprocal inches).

The thermoplastic material should be capable of being softened by the action of heat to a temperature at which it is sticky and quite plastic, without decomposition and should be substantially non-thermoplastic at temperatures up to at least 100° C. Plasticised cellulose acetate has been found very suitable for the process of the invention, which will be described with particular reference to the production of heat insulating sheet material from small pieces of film of this material.

In the preferred method of carrying out the invention the layer of thermoplastic material is formed on a substantially horizontal porous or perforate surface, the material is heated by means of a radiant heater above and substantially parallel to said surface, and the suction is applied through the pores or perforations in that surface. The process can be carried out batchwise, semi-continuously or continuously.

For carrying out the process as a batch operation, apparatus such as is commonly used in the vacuum forming of thermoplastic sheet materials has been found very suitable. Such apparatus comprises a wide open-mouthed vessel ("the vacuum box") constructed to withstand atmospheric pressure when evacuated, and having a perforated false bottom ("the platform") which may be formed of a rigid steel perforated plate, the space within the vessel below the platform being connected through a wide-bore pipe controlled by a quick-opening valve, with a vacuum tank, the arangement being such that on opening the valve the said space is put into communication immediately with the evacuated space within the vacuum tank, so causing air to be drawn rapidly through the perforations in the platform. The means for heating the thermoplastic material may with advantage comprise a blanket-type radiant heater, mounted to run on rails extending above the vacuum box, so that once the thermoplastic material resting on the platform of the vacuum box has been raised to a sufficiently high temperature by the heater, the latter can be pushed along the rails to one side of the vacuum box. Means are provided for automatically evacuating the vacuum box as soon as the pressure therein has risen above a predetermined small value. Apparatus of this kind is described and illustrated for instance in U.S. application S.N. 490,056, filed February 23, 1955, now abandoned and in British Plastics 27, January 1, 1954, pp. 18 to 19.

A batch method of carrying out the process of the invention is described in the following example.

*Example 1*

The apparatus was as described above. The platform of the vacuum box was a steel plate 2 feet square perforated by holes 1/16 inch diameter at 1/2 inch centres. The vacuum tank had a capacity five times that of the vacuum box.

The material was a film 1 mil thick of plasticised cellulose acetate trimmed from the edges of a wider film during extrusion. The acetyl value of the cellulose acetate (expressed as acetic acid) was 54% and the film contained 24% by weight of triacetin. This film trimming was cut into pieces about 1/4 inch square by passage through a windmill-type cutter.

On the platform of the vacuum box a layer of the pieces of film 1 inch deep was formed. With the valve closed the blanket heater was brought over the mouth of the vacuum box at a distance of 1 inch from the surface of the layer of the film and was allowed to remain there until the pieces of film at the surface were seen to soften and shrink. The blanket heater was then pushed along its rails to one side and simultaneously the valve was opened wide. The suction so applied caused consolidation of the heat-softened fragments of film into a coherent sheet about 1/4 inch thick containing a high proportion of air spaces. This sheet was stripped from the platform of the vacuum box when it had cooled to a temperature at which the plasticised cellulose acetate was no longer plastic. This cooling occurred in the course of a few seconds after the removal of the heater. The sheet material obtained was suitable for use as heat insulating material at temperatures up to 100° C. It was of low apparent density, or irregular surface and traversed by numerous large pores.

*Example 2*

The process was carried out as in Example 1 but with sheet material of thickness 7 mils, of cellulose acetate of acetyl value 56%, the film containing 28% of its weight of diethyl phthalate.

For some purposes sheet material of greater strength and lower permeability than that obtainable by the process as described above is required. These properties can readily be obtained by bonding to the sheet material, thermoplastic material, e.g. the thermoplastic material forming the basis of the heat-insulating sheet. The bonding can be effected in the same operation as the welding together of the randomly arranged pieces to form the sheet. Thus the suction applied to consolidate the pieces may be caused to suck down onto them a heat-softened film of the thermoplastic material so causing the film to be welded to the particles forming a continuous skin over one surface thereof. When this method is adopted the film, clamped in a suitable frame, is softened by means of a radiant heating blanket arranged to one side of the vacuum-forming machine while the layer is being heated on the perforated table of the machine. When the film and the layer are at the desired temperature the heater over the layer is moved to one side, the frame carrying the heat-softened film is clamped on to the mouth of the vacuum box making an air tight connection therewith and the suction is then applied. Alternatively, the bonding may be effected as a separate operation, the initially formed sheet of randomly arranged pieces being sufficiently porous to allow suction to be applied through it to draw down upon it a heat-softened film clamped above it. Good adhesion can be obtained even when the initially formed sheet is at a temperature substantially below that at which it becomes soft and adhesive. The following example describes forming in two stages a sheet having a skin over one surface.

*Example 3*

A sheet of heat insulating material was formed as in Example 1 but was not stripped from the platform of the vacuum box. Instead it was allowed to remain in position while a foil of the plasticised cellulose acetate of the same composition as that from which the small pieces were formed and of thickness 5 mils was clamped across the mouth of the vacuum box and heated until plastic by the blanket heater as for an ordinary vacuum forming operation. When the foil was at a suitable temperature the blanket heater was again moved to one side and the suction applied by rapidly opening the valve to its full extent. This caused the foil to be sucked down into contact with the sheet of heat insulating material to which it adhered forming a composite sheet of added strength, and devoid of visible pores.

In carrying out the process of the invention as a continuous operation, the layer of particles of thermoplastic material may be formed on a travelling belt of perforate or porous material, e.g. a wire-gauze belt, and carried by movement of that belt first under a blanket heater which raises it to the desired temperature, then over a vacuum box where the suction is applied, the sheet so formed being finally stripped from the belt after a short cooling run. The stripping may be effected or facilitated by the application of compressed air from beneath the belt. The travel of the belt may be continuous or intermittent.

Products of the kind described in Example 3 may be made in continuous lengths on a moving perforate belt on which after the layer of small pieces of thermoplastic material has been welded into a coherent sheet as described above, a heat-softened thermoplastic foil is sucked into contact with the sheet during the further travel thereof.

As indicated above plasticised cellulose acetate is a particularly suitable material from which to form heat insulating sheet. The acetyl value of the cellulose acetate (expressed as acetic acid) may range from about 52–62.5%. Particularly useful results have been obtained with cellulose acetates of acetyl value of between 52 and 56% and especially between 52 and 54%. Where relatively high moisture resistance is required, however it is desirable to employ a cellulose acetate of acetyl value above 56%, e.g. 58–62.5%. The cellulose acetate must however be adequately plasticised and the choice of suitable plasticisers is more limited with cellulose acetates of high acetyl value than those that have an acetyl value up to about 56%.

Good results have been obtained with film forming material of cellulose acetate containing 18–30% of a plasticiser such as diethyl phthalate, triacetin or a mixture of dimethyl phthalate with a minor proportion e.g. 25% of triphenyl phosphate. Other plasticisers that may be employed include: dibutyl phthalate, dimethoxy ethyl phthalate, methyl ethyl phthalate, methyl phthalyl ethyl glycolate, ethyl phthalyl ethyl glycolate, dibutyl tartrate, glycerol monolactate triacetate, glycerol monobenzoate diacetate, diethyl adipate, dimethoxy ethyl adipate, di-methoxy ethoxy ethyl adipate, and trichloroethyl phosphate.

Instead of cellulose acetate other plasticised thermoplastic substitution derivatives of cellulose may be employed. Particularly suitable are the cellulose esters of paraffinic monocarboxylic acids containing 2 to 4 carbon atoms, e.g. (apart from cellulose acetate) cellulose propionate, cellulose butyrate, cellulose acetate-propionate and cellulose acetate butyrate. Water-insoluble thermoplastic cellulose ethers, e.g. ethyl cellulose may also be employed.

Although cellulose derivatives of the kind referred to above are particularly suitable in view of their relatively high heat softening points, their strength and toughness, other thermoplastic materials may be employed, e.g. polymerised vinyl compounds such as polystyrene, copolymers of vinyl acetate with vinyl chloride and of vinyl chloride with vinylidene chloride (whether as a major or a minor proportion) or with methacrylonitrile. These vinyl-type polymers like plasticised cellulose acetate soften over a substantial temperature range and are for that reason more suitable than sharply melting crystallisable polymers such as polythene, polyhexamethylene diamine and polyethylene terephthalate.

As indicated above, it is not essential for the thermoplastic material to be in the form of fragments of sheet material. Thus, for example, fibrous materials may be employed alone or in admixture with fragments of sheet material and/or of flake. Spinning waste of cellulose acetate or other fibrous thermoplastic material may for instance be employed in this way, as may small fragments of fabric of such material. To assist adhesion the material may be wetted with a plasticiser, solvent, or potential solvent or other liquid having a softening effect at the vacuum forming temperature, care being taken of course to avoid introducing a fire hazard by the use of unduly volatile inflammable liquids. With cellulose acetate, water alone has a useful softening effect. More effective than water, however, are aqueous solutions of high boiling solvents or plasticisers, e.g. diethylene glycol diacetate or triacetin. Such solutions may be of low concentration, e.g. 1 to 10% or even 1 to 5% by weight.

The fragments of thermoplastic material, whether fibrous or not, may be employed in admixture with suitable non-thermoplastic materials. Thus for example cellulose acetate fibre may be employed in admixture with non-thermoplastic fibre such as cotton or regenerated cellulose, or small pieces of cellulose acetate foil may be used in admixture with small pieces of regenerated cellulose foil. Alternatively or in addition to the use of a softening agent for the thermoplastic material a thermoplastic adhesive, e.g. polyvinvyl acetate, may be used.

The process of the invention may be used to produce material for decorative purposes, e.g. material simulating snow or ice for Christmas decorations. Coloured decorative materials can also be obtained, e.g. by employing coloured fragments of thermoplastic material.

Having described my invention, what I desire to secure by Letters Patent is:

1. Process for making a material that is suitable for use in heat insulation, which comprises forming from pieces of water-resistant thermoplastic film of area 0.01 to 0.25 sq. in. and thickness 0.005 to 0.01", a layer which is many times the thickness of the pieces and in which the pieces are randomly arranged in contact with one another, heating said layer by radiant heat to a temperature at which the thermoplastic material is soft and adhesive, and by suddenly applying suction and passing an air stream through the layer while said pieces are in a heat-softened condition while preventing the bodily movement of the layer, uniting the pieces while they are still randomly arranged into a coherent sheet of irregular surface and of a thickness substantially less than the said layer.

2. Process for making a material that is suitable for use in heat insulation, which comprises forming from pieces of water-resistant thermoplastic film comprising plasticized cellulose acetate, of area 0.01 to 0.25 sq. in. and thickness 0.005 to 0.01", a layer of which is many times the thickness of the pieces and in which the pieces are randomly arranged in contact with one another, heating said layer by radiant heat to a temperature at which the thermoplastic material is soft and adhesive, and by suddenly applying suction and passing an air stream through the layer while said pieces are in a heat-softened condition while preventing the bodily movement of the layer, uniting the pieces while they are still randomly arranged into a coherent sheet of irregular surface.

3. Heat-insulating material prepared by the process of claim 1.

References Cited in the file of this patent

UNITED STATES PATENTS

| | | |
|---|---|---|
| 2,281,635 | Strauss | May 5, 1942 |
| 2,335,757 | Hall | Nov. 30, 1943 |
| 2,357,392 | Francis | Sept. 5, 1944 |
| 2,476,282 | Castellan | July 19, 1949 |
| 2,503,024 | Boese et al. | Apr. 4, 1950 |
| 2,590,221 | Stevens | Mar. 25, 1952 |
| 2,609,539 | Shearer | Sept. 9, 1952 |
| 2,690,593 | Abercrombie | Oct. 5, 1954 |

FOREIGN PATENTS

| | | |
|---|---|---|
| 123,758 | Australia | June 4, 1945 |